3,176,017
AROYLALKYL DERIVATIVES OF DIAZABICYCLO-
NONANES AND -DECANES
Meier E. Freed, Philadelphia, Pa., assignor to American
Home Products Corporation, New York, N.Y., a corporation of Delaware
No Drawing. Filed Feb. 26, 1963, Ser. No. 261,212
5 Claims. (Cl. 260—268)

This invention relates to aroylalkyl derivatives of diazabicyclic compounds, which derivatives exhibit a depressant activity on the central nervous system.

The novel compounds made available by the present invention are defined by the following formula:

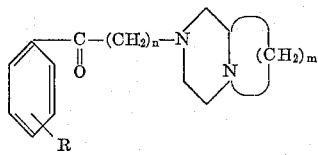

in which $n$ is 2 or 3, R represents a halogen, preferably fluorine, alkoxy or an alkyl radical and $m$ is 3 or 4.

The compounds sought to be patented are basic in nature and readily form solid pharmaceutically acceptable acid-addition salts with organic and inorganic acids such as hydrochloric acid, sulfuric acid, acetic acid, fumaric acid and the like.

The compounds sought to be patented are prepared by reacting in an inert solvent such as ether, toluene, xylene, dioxane and the like in the presence of an acid acceptor such as potassium bicarbonate or triethylamine, or certain known omega-haloalkanophenones having the general structure:

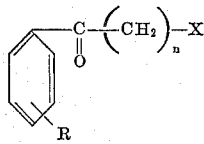
II where $n$ ranges from 2 to 3, X is chlorine, bromine or iodine, the chloro derivative being preferred, and R is halogen, alkyl or (lower) alkoxy, with 1,4-diazabicyclo-nonanes or decanes of the formula:

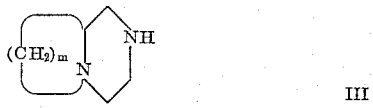
III where $m$ is 3 or 4, which, together with methods for their preparation are disclosed in the Journal of Org. Chem., 25, 2108 (1960).

The above noted reactants are refluxed at the reflux temperature of the solvent for a period of 2 to 24 hrs. After this time, the reaction mixture is cooled and filtered. The filtrate is extracted with dilute aqueous hydrochloric acid. The aqueous acid solution is made basic thereby forming an oil which is extracted with ether. The extract is washed with salt water and the ether solution is dried with a drying agent such as sodium sulfate. The solution is filtered and the filtrate is evaporated. The residue is distilled under reduced pressure to form the basic product. This product in turn may be converted to its acid-addition salt by treatment with hydrogen chloride in ethanol, as one example.

The following examples in which all temperatures are in degrees centigrade constitute the best mode of carrying out the invention.

*Example 1*

4 - (3 - p - fluorobenzoylpropyl)-1,4-diazabicyclo[4.3.0]nonane.

A solution of 1,4-diazabicyclo[4.3.0]nonane (3.5 grams, 0.025 mole) and 5 grams (0.025 mole) of 4-chloro-p-fluorobutyrophenone was refluxed in toluene (100 ml.) in the presence of 10 grams of potassium bicarbonate for 48 hours. The mixture was cooled and filtered. The filtrate was extracted with 10% aqueous hydrochloric acid. The aqueous acid solution was made basic and the oil extracted with ether. The extract was washed with saline. The ethereal solution was dried over sodium sulfate, filtered and the filtrate evaporated. The residue was distilled under reduced pressure, B.P.=155–165°/0.2 mm. Yield: 3 grams. The di-hydrochloride salt was prepared (dry hydrogen chloride in ethanol) and recrystallized from ether-alcohol, and finally from absolute ethanol, M.P. 180–181°.

*Analysis.*—Calculated for $C_{17}H_{25}Cl_2FN_2O:H_2O$: C, 55.65; H, 7.14; N, 7.35; Cl, 18.65. Found: C, 55.31; H, 7.12; N, 7.62; Cl, 19.00.

*Example 2*

4 - (3 - p - fluorobenzoylpropyl)-1,4-diazabicyclo[4.4.0]decane is prepared from 3.5 grams of 1,4-diazabicyclo[4.4.0]decane and 5 grams of 4-chloro-p-fluorobutyrophenone; as above described in Example 1.

*Example 3*

4 - (2 - p-methoxybenzoylethyl)-1,4-diazabicyclo[4.3.0]nonane is prepared from 3.5 grams of 1,4-diazabicyclo[4.3.0]nonane and 4.9 grams of 3-chloro-p-methoxypropiophenone, as above described in Example 1.

*Example 4*

4 - (3 - p-methylbenzoylpropyl)-1,4-diazabicyclo[4.3.0]nonane is prepared from 3.5 grams of 1,4-diazabicyclo[4.3.0]nonane and 5.1 grams of 4-chloro-p-methylbutyrophenone, as above described in Example 1.

*Example 5*

Employing the procedure of Example 1, 4-(3-p-bromobenzoyl propyl)-1,4-diazabicyclo[4.3.0]nonane is prepared from 1,4-diazabicyclo[4.3.0]nonane and 4-bromo-p-bromobutyrophenone.

*Example 6*

Employing the procedure of Example 1, 4-(3-p-ethoxybenzoylpropyl)-1,4-diazabicyclo[4.4.0]decane is prepared from 1,4-diazabicyclo[4.4.0]decane and 4-chloro-p-ethoxybutyrophenone.

*Example 7*

Employing the procedure of Example 1, 4-(2-p-iodobenzoylethyl)-1,4-diazabicyclo[4.3.0]nonane is prepared from 1,4-diazabicyclo[4.3.0]nonane and 3-iodo-p-iodopropiophenone.

The compounds of this invention can be administered in a wide variety of oral or parenteral unit dosage forms, singly, or in admixture with other active compounds. In general, the effective daily dose for these compounds ranges from about 5 mg. to about 200 mg. per kilogram of body weight.

The present invention also includes the process of bringing the compounds thereof into a form suitable for therapeutic administration by associating them with liquid or solid, pharmaceutically acceptable carriers.

Various changes and modifications of this invention can be made by those skilled in the art to which it relates and to the extent that such variations incorporate the spirit of the invention, they are included in the scope of the claims.

What is claimed is:

1. A compound of the formula:

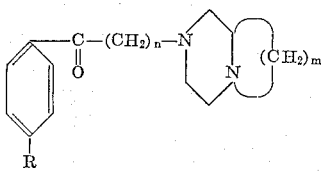

wherein R is selected from the group consisting of halogen, lower alkoxy, and lower alkyl; $n$ is a number ranging from 2 to 3; and $m$ ranges from 3 to 4.

2. 4 - (3-p-fluorobenzoylpropyl)-1,4-diazabicyclo[4.4.0] decane.

3. 4-(3-p-fluorobenzoylpropyl)-1,4-diazabicyclo[4.3.0] nonane.

4. 4-(2-p-methoxybenzoylethyl)-1,4-diazabicyclo[4.3.0] nonane.

5. 4-(3-p-methylbenzoylpropyl)-1,4-diazabicyclo[4.3.0] nonane.

References Cited in the file of this patent

UNITED STATES PATENTS 2,999,091    Zaugg ---------------- Sept. 5, 1961

OTHER REFERENCES

Freed et al.: Journal Organic Chemistry, vol. 25, pp. 2108–2113 (1960).